United States Patent [19]

Fukai et al.

[11] Patent Number: 5,188,677
[45] Date of Patent: Feb. 23, 1993

[54] METHOD OF MANUFACTURING A MAGNETIC DISK SUBSTRATE

[75] Inventors: Hideaki Fukai; Hiroyoshi Suenaga; Kuninori Minakawa, all of Tokyo, Japan

[73] Assignee: NKK Corporation, Tokyo, Japan

[21] Appl. No.: 719,331

[22] Filed: Jun. 21, 1991

Related U.S. Application Data

[62] Division of Ser. No. 536,701, Jun. 12, 1990, Pat. No. 5,120,615.

[30] Foreign Application Priority Data

Jun. 16, 1989 [JP] Japan .................. 1-153855
Mar. 9, 1990 [JP] Japan .................. 2-56449

[51] Int. Cl.$^5$ .................................... C21D 11/00
[52] U.S. Cl. ........................ 148/501; 148/504; 148/505; 148/670
[58] Field of Search .............. 148/11.5 F, 12.7 B, 148/501, 504, 505, 670

[56] References Cited

U.S. PATENT DOCUMENTS

| | | | |
|---|---|---|---|
| 4,886,559 | 12/1989 | Shindo et al. | 148/421 |
| 4,908,072 | 3/1990 | Taki et al. | 148/11.5 F |
| 4,990,362 | 2/1991 | Kibe et al. | 427/129 |

FOREIGN PATENT DOCUMENTS

| | | |
|---|---|---|
| 0224875 | 7/1985 | German Democratic Rep. ............ 148/11.5 |
| 52-105804 | 5/1977 | Japan . |
| 52-74746Y/42 | 9/1977 | Japan . |
| 59-151335 | 8/1984 | Japan . |
| 61-274687 | 3/1985 | Japan . |
| 61-199224 | 9/1986 | Japan . |
| 1-112521 | 5/1989 | Japan . |

OTHER PUBLICATIONS

Kyuzo Nakamura, "Metals & Technology", No. 1986, pp. 38–43.
Masahiro Saito et al, "Jitsumu Hyomen Gijutsu", vol. 35, No. 6, 1988, *Practical Surface Technology*, pp. 6–11.
Hiroyoshi Ishizaki, "Kogyo Zairyo", vol. 35, No. 5 pp. 89–95, *Engineering Materials*.
Denshi Zairyo Hyomen Shori Gijutsu, Jul. 1987, (*Electronic Material Surface Treatment Technology*).

*Primary Examiner*—John P. Sheehan
*Attorney, Agent, or Firm*—Frishauf, Holtz, Goodman & Woodward

[57] ABSTRACT

A method of manufacturing a titanium alloy magnetic disk substrate comprising (a) cold-rolling an alloy plate at a rolling ratio of no less than 30%, the alloy plate comprising 0.5 wt. % to 1.0 wt. % of Mo and containing oxygen, nitrogen and carbon in amounts such that O+2N+0.75C is from 0.03 wt. % to 0.5 wt. % of the titanium alloy, and the balance being Ti, wherein O is the wt. % of oxygen, N is the wt. % of nitrogen and C is the wt. % of C to form a magnetic disk substrate material and then (b) thermal-flattening the magnetic substrate material from step (a) under a condition defined as follows:

$$500 \leq T \leq -(150/11)\cdot t + 7{,}850/11 \quad 1 \leq t$$

where T represents a thermal-flattening temperature in °C., and t represents a thermal-flattening time in hours.

17 Claims, 1 Drawing Sheet

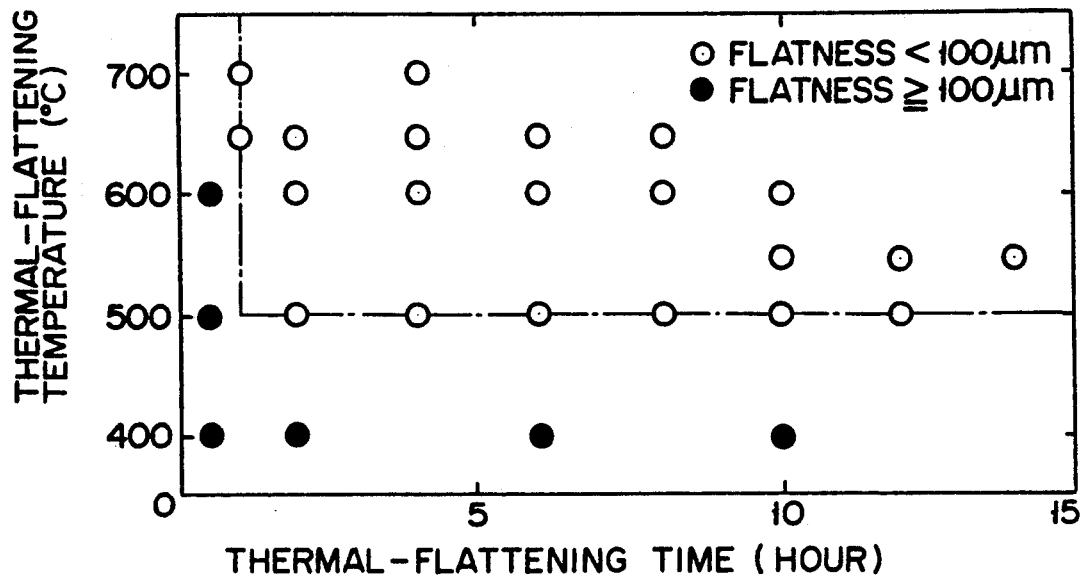
F I G. 1
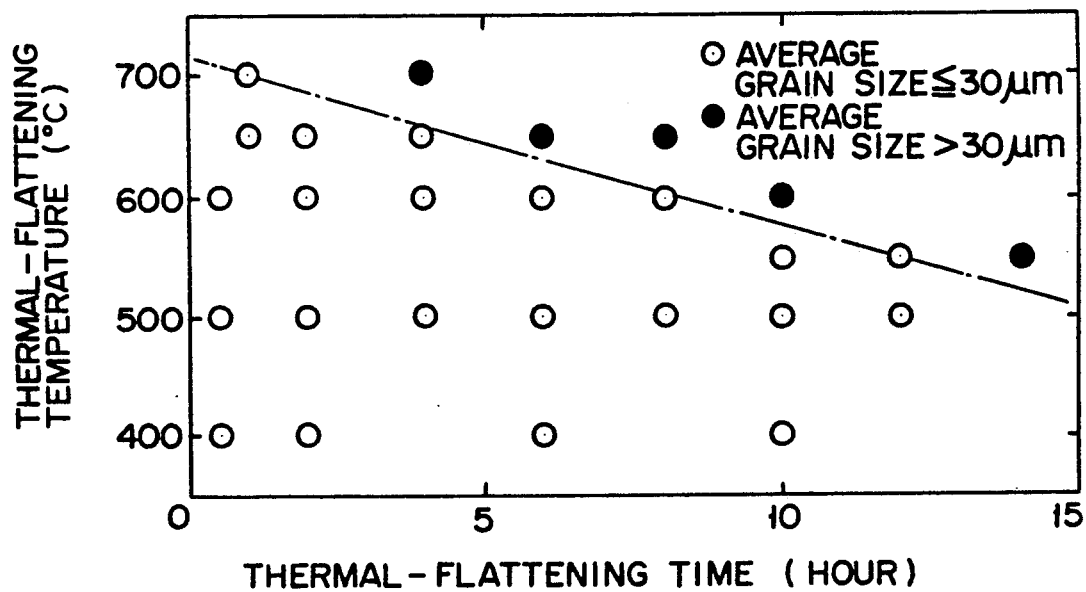
F I G. 2

METHOD OF MANUFACTURING A MAGNETIC DISK SUBSTRATE

This is a division of application Ser. No. 07/536,701, filed Jun. 12, 1990, now U.S. Pat. No. 5,120,615, issued Jun. 9, 1992.

BACKGROUND OF THE INVENTION

1. Field of the Invention

This invention concerns a magnetic disk substrate, and in particular, a magnetic disk substrate with excellent heat resistance which can be made very thin, and which is suitable for the manufacture of magnetic disks of high recording density.

2. Description of the Related Art

A magnetic disk, used as a recording medium for a computer, comprises a substrate and a magnetic film formed on the substrate. The substrate is required to have the following properties:

(a) Its surface properties after precision machining, precision grinding or precision polishing must be satisfactory so that magnetic heads can run smoothly over the disk, and such that stable magnetic properties are obtained with few magnetic errors.

(b) There must be no protuberants or holes in its surface which could lead to defects in the magnetic medium formed on the substrate.

(c) It should have sufficient strength and rigidity to withstand high speed rotation when the disk is used, and precision machining during manufacture.

(d) It must be able to withstand the heat applied when forming the magnetic medium.

(e) It must be lightweight and non-magnetic.

(f) It must have some degree of corrosion resistance.

Conventionally, Al-Mg or other aluminum alloys are used as substrate materials satisfying these conditions.

Recently, there has been a trend in magnetic disks toward higher recording densities and greater compactness, so the following conditions must also be met:

(A) The magnetic medium must have improved magnetic properties, for example it must be possible to form a medium with high coercive force.

(B) The magnetic medium must be made thinner.

(C) The flying height of the magnetic heads must be lessened.

(D) The gap length of the magnetic heads must be reduced.

(E) Techniques for positioning the magnetic heads must be improved.

(F) The substrate must be made more compact and thinner.

In order to satisfy these requirements, various provisions are conventionally adopted.

A magnetic medium of high recording density is formed by sputtering (Kyuzo Nakamura, "Kinzoku" (Metals), Nov. 1986), or the substrate is made resistant to the heat applied during sputtering.

To lessen the flying height of the magnetic heads, the aluminum alloy disk is given a Ni-P plating to cover inclusions. In this way, high level surface properties are obtained with little surface roughness and undulations (Masahiro Saito, "Jitsumu Hyomen Gijutsu" (Practical Surface Technology), Vol. 35, No. 6, 1988).

Further, alloy compositions with few inclusions that could lead to electrical and magnetic errors are used for the substrate (Unexamined Published Japanese Patent No. 63-216953, and attempts are made to reduce the thickness of the substrate itself.

To satisfy the above conditions (a)-(f), new materials are constantly being developed to replace aluminum alloys. Examples of these are glass (Hiroyoshi Ishizaki, "Kogyo Zairyo" (Engineering Materials), Vol. 35, No. 5), ceramics (Takeshi Matsumoto, "Jisei Zairyo Kenkyukai" (Magnetic Material Research Group), "Denshi Zairyo Hyomen Shori Gijutsu" (Electronic Material Surface Treatment Technology), Jul. 1987, and titanium (Published Unexamined Japanese Patent Applications Nos. 52-105804, 59-151335 and 63-142521).

Al-Mg or other aluminum alloys conventionally used as magnetic disk substrates however have the disadvantage that they do not have sufficient heat resistance to withstand the substrate temperature rise produced by sputtering, which is carried out to form a magnetic medium with a high coercive force and low thinness required for high recording density. Further, although the composition of this material was adjusted, it still contained essentially a large number of inclusions and high level surface properties could not be obtained. It is therefore impossible to achieve the reduction of the head flying height required for high recording density, and achieve a sufficient reduction of electrical errors.

To obtain high level surface properties, the surface is plated with Ni-P as described above, but the method has the disadvantage that the plating yield is fairly low. Further, the Ni-P plating tends to crystallize and retain its magnetism at the fairly low temperature of about 350° C., and peel off.

Further, if the aluminum alloy substrate is made thin according to demand, sufficient strength and rigidity cannot be guaranteed to enable it to withstand the high speed disk rotation (for example 3600 rpm) required for a short access time.

Further, if glass or ceramics were used as substrate materials, sufficient heat resistance and strength are obtained, but both materials are brittle and are therefore not very reliable. In the case of glass, moreover, gas discharges occurred due to the high temperature applied for sputtering, and elemental impurities in the glass diffused into the magnetic medium, whereby the magnetic properties of the medium are adversely affected. Ceramic substrates, on the other hand, contain a large number of pores, and sufficient surface properties cannot be obtained. Glass and ceramics are therefore still unsatisfactory as substrate materials.

As mentioned above, various proposals have been made regarding titanium substrates. In said Published Patent Application No. 52-105804, for example, a magnetic disk substrate is proposed based on titanium or titanium alloy with an oxide or nitride layer formed on the surface. This layer is formed by oxidation or nitriding the surface, thereby increasing surface hardness and improving machinability so as to obtain satisfactory surface properties. Further, Published Unexamined Japanese Patent Application No. 59-151335 proposes a magnetic disk substrate of c type titanium alloy containing no less than 80% of hcp phase in terms of volume fraction, and a strength of no less than 60 kgf/mm$^2$.

Further, ordinary pure titanium and c type titanium alloys unavoidably contain $\beta$ stabilizing elements such as Fe and V to the extent of 0.1 weight %. These $\beta$ stabilizing elements easily segregate in the melting, blooming and rolling steps, and easily give rise to pitting due to segregation during polishing. If it is attempted to obtain high level surface properties, therefore, the yield declines. Further, the rate of oxidation and nitriding is different in the α and β phases (segregation band), and it is difficult to oxidize or nitride uniformly. The yield of substrates coated with an oxide or nitride layer is therefore lower than that of substrates consisting only of titanium, and manufacturing costs are higher. It is stipulated that the total content of elemental impurities in ordinary titanium or α type titanium should not exceed 0.3 weight %. This level of impurities is much lower than that in aluminum alloys, however it is still not sufficiently low to eliminate all the errors due to inclusions, and to obtain high level surface properties.

At present, therefore, a satisfactory magnetic disk substrate cannot be obtained even if titanium is used as the principal material.

SUMMARY OF THE INVENTION

The present invention has been made in consideration of the above problem, and has as its object to provide a magnetic disk substrate with excellent heat resistance that can be made thin, is free from pitting that is responsible for magnetic errors, can be manufactured in a high yield, and has high-level surface properties and to provide a method of manufacturing the substrate.

According to the present invention, there is provided a magnetic disk substrate comprising 0.5 wt % to 1.0 wt % of Mo, 0.03 wt % to 0.5 wt % of O+2N +0.75C., and the balance of Ti. In this case, it is preferable that the average grain size is no greater than 30 μm.

According to the present invention, there is provided a method of manufacturing a magnetic disk substrate in the following manner. An alloy plate comprising 0.5 to 1.0 wt % of Mo, 0.03 to 0.5 wt % of O+2N+0.75C fall and the balance of Ti is cold-rolled at a rolling ratio of 30% or more to form a magnetic disk substrate material, and the material is flattened under the following condition:

$$500 \leq T \leq -(150/11) \cdot t + 7850/11 \quad 1 \leq t$$

where T represents a thermal-flattening temperature (° C.), and t represents a thermal-flattening time (hour).

The present inventors made extensive studies and found that surface properties of the magnetic disk substrate mainly depended on the component and composition of the substrate material and the excellent surface properties could be obtained using Ti as the matrix of the substrate material and controlling gaseous components in the Ti and additive components. They also found that excellent surface properties could be obtained by making the average grain size of the disk substrate no greater than 30 μm and that, in order to manufacture the magnetic disk having fine crystal grains, a cold-rolling ratio and a thermal-flattening condition had to be suitably controlled. The present invention has thus been made from the above findings.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 1 is a graph showing a relationship between a thermal-flattening condition and flatness of a substrate after thermal-flattening; and FIG. 2 is a graph showing a relationship between the thermal-flattening condition and an average grain size of the substrate after thermal-flattening.

DETAILED DESCRIPTION OF THE PREFERRED EMBODIMENT

The present invention will be described in detail below.

A magnetic disk substrate according to the present invention comprising 0.5 to 1.0 wt % of Mo, 0.03 to 0.5 wt % of O+2N+0.75C and the balance of Ti.

The melting point of titanium is as high as about 1,650° C. If titanium is used as a magnetic disk substrate material, the substrate can be given satisfactory heat resistance, and it is not deformed even at 300° to 400° C. which is the temperature at which sputtering is performed to form the magnetic medium. Furthermore, the tensile strength of titanium is approximately 30 kgf/mm$^2$, its modulus of longitudinal elasticity is approximately 10,000 kgf/mm$^2$, that is, its strength and rigidity are high. Even if it is thin, it can fully withstand the centrifugal force produced at high rotation speeds of 3,600 rpm or over. Further, since the matrix of the substrate is made of only titanium, it can easily be manufactured in small thicknesses, and there is no peeling at inter-layer interfaces unlike in Ni-P plated Al alloy substrates. It is therefore preferable to use titanium as the substrate material.

In the present invention, Mo, is added to the titanium matrix. Mo has an effect for making the grains fine, when Mo is added to the titanium matrix. The addition of these elements therefore can make the surface properties excellent. However, when the content of Mo is less than 0.5 wt %, the effect is insufficient. When the content exceeds 1.0 wt %, these elements are easily segregated to cause pitting during polishing. Therefore, the content of Mo is defined to fall within the range of 0.5 to 1.0 wt %.

O, N and C may be solid solution in the titanium matrix, and substrate strength is improved by a solid solution hardening. These elements are therefore effective in permitting the thickness of the titanium substrate to be made smaller. Although these elements can improve strength, they also impair workability, and have an adverse effect on yield in manufacture of blanks before the mirror finish step. The contents of O, N and C added are therefore limited to a specific range. If O, N and C are contained in the matrix independently, the desired strength is not obtained if their contents are less than 0.03 wt %, 0.015 wt % and 0.04 wt %, respectively. It is preferable that their contents are respectively O$\geq$0.03 wt %, N$\geq$0.015 wt % and C$\geq$0.04 wt %. If the contents of these elements are excessive, workability declines. More specifically, if O, N and C exceed 0.5 wt %, 0.25 wt %, and 0.67 wt %, respectively, cold workability is degraded, and it is preferable that O$\leq$0.5 wt %, N$\leq$0.25 wt % and C$\leq$0.67 wt %. As all these elements exhibit similar actions, it is necessary to specify their total content. Further, their composition ratio is given as O : N : C = 1 : 2 : 0.75. The total content is therefore specified by the condition that 0.03 wt % $\leq$O+2N+0.75C$\leq$0.5 wt %.

The substrate material is a polycrystalline material, and the crystals on its surface have various orientations. In the mirror finish step, the speed of precision polishing and precision grinding is different depending on the crystal orientation, and differences in level occur among the crystals. The finer the grain size, the smaller the difference in the orientations of neighboring grains and the smaller the differences in level.

Conventionally, in a cold-rolled sheet of an $\alpha$ type titanium alloy, the grain size was about 50 $\mu$m on average, but better substrate surface properties can be obtained by making the average no greater than 30 $\mu$m. More specifically, if the average grain size is greater than 30 $\mu$m, the difference in level assumes a relatively large value of 0.04 $\mu$m to 0.08 $\mu$m, but by making the grain size no greater than 30 $\mu$m, the difference in level can be made less than 0.04 $\mu$m and satisfactory surface properties can be obtained. It is therefore preferable that the average grain size is not greater than 30 $\mu$m.

As described above, the grain size can be fine by properly adding Mo. To make the average grain size smaller and no greater than 30 $\mu$m, the manufacturing conditions must be properly specified.

The titanium magnetic disk substrate can be generally obtained by the following manner. An ingot having predetermined components and a predetermined composition is forged, hot-rolled and then cold-rolled, and the resultant cold-rolled sheet is punched out in a ring shape to form a substrate material. This substrate material is thermal-flattened, and its surface is polished to form a mirror surface. The grain size of the substrate depends on the draft in cold rolling and the thermal-flattening temperature and time in the above steps. Therefore, in order to obtain a substrate having an average grain size of no greater than 30 $\mu$m, the draft in cold rolling and the thermal-flattening temperature and time must be specified within predetermined ranges.

According to the present invention, the titanium alloy plate having the composition within the above composition range is cold-rolled and distorted at a rolling ratio of 30% or more to control the structure during thermal-flattening. The disk substrate material formed by punching out the cold-rolled sheet is thermal-flattened in the following conditions to cause recrystaleization and is flattened under the condition satisfying the following equations: $500 \leq T \leq -(150/11) \cdot t + 7850/11$ and $1 \leq t$, where a thermal-flattening temperature is represented by T° C. and a thermal-flattening time is represented by t hours. Thus, the average grain size can be no greater than 30 $\mu$m without deteriorating flatness required as a magnetic disk substrate. Note that the substrate is preferably thermal-flattened while being clamped between two bases each having high flatness (the flatness of no greater than 100 $\mu$m).

When thermal-flattening is performed at a temperature of less than 500° C. for less than 1 hour, distortion of the material cannot be effectively removed and is left after thermal flattening, thereby failing to obtain excellent flatness. Although the flatness of the magnetic disk substrate becomes excellent by increasing the thermal-flattening temperature and prolonging the thermal-flattening time (the flatness is close to the flatnesses of the bases when thermal-flattening is performed by clamping the substrate between the bases), the grains are enlarged when the increases in temperature and time are excess. That is, even if the conditions of $500 \leq T$ and $1 \leq t$ are satisfied, when thermal-flattening is performed using temperature and time which do not satisfy the condition of $T \leq -(150/11) \cdot t + 7850/11$, the average grain size exceeds 30 $\mu$m.

At a rolling ratio of less than 30%, it is difficult to leave distortion enough to maintain structural control during thermal-flattening in the cold-rolled sheet.

If a rare-earth element such as Y is added to the substrate material in a small amount to improve machinability, the effect of the present invention is not lost.

As described above, Mo has an effect of making grains fine. Generally, $\beta$-stablizing elements have such an effect as Mo. Therefore, Ni, Cr, Co, or Fe which serves as $\beta$-stablizing element may be added to the titanium matrix, instead of Mo. However, the content of the element or elements is defined to fall within the range of 0.5 to 1.0 wt %, as in the case of Mo.

EXAMPLES

The present invention will be described below in detail by way of its examples.

Ingots (composition numbers 1 to 9) having the compositions shown in Table 1 were manufactured by VAR melting, and were forged at 1,000° C. to form slabs of thickness of 20 mm. Final hot rolling was performed on the slabs at 870° C. so as to obtain a hot-rolled plate of thickness of 6 mm. The oxide layer on this hot-rolled plate was removed, the plate was ground-cut into a plate thickness of 5 mm, and cold rolling was then performed on the plate so a to obtain a cold-rolled sheet of thickness of 0.6 mm. The strength and cracks in the cold-rolled sheet were estimated.

This cold-rolled sheet was punched out to form ring plates (the outer diameter of 95 mm, the inner diameter of 25 mm, and the thickness of 0.6 mm), and the ring plates were thermal-flattened at a temperature of 600° C. for 6 hours. Then, the surfaces of the disks were ground by #400, #800, #1,500, and #4,000 grindstones (# is JIS (Japanese Industrial Standard) mesh number) in that order finally given an alumina finishing polish so as to produce magnetic disk substrates. 50 magnetic disk substrates were prepared from each of the above compositions. Pits, grain sizes, and surface properties (Ra) of these magnetic disk substrates were estimated. Table 1 shows the estimated results with the compositions of the substrates. Note that, in Table 1, the composition numbers 1 to 5 were within the composition range of the present invention, and the composition numbers 6 to 9 were comparative examples which fell outside the range of the present invention. The terms "cracks" refers to the presence or absence of cracks of 1 mm or more (the absence is indicated by symbol o and the presence is indicated by symbol ×) produced in the process of rolling. The term "number of substrates with pitting" refers to the number of disks in which pits were observed when the 50 disks were observed by a differential interference microscope at a magnification of 100×, 60 fields, respectively. In the column concerning surface properties (Ra), a roughness curve was calculated by eliminating low frequency components from the outline curve of the sectional surface obtained when the object to be measured was cut by a flat surface perpendicular to the surface to be measured. The length L of this curve in the direction of the surface was extracted, and the roughness curve was represented by $y = f(x)$ with the center line of the extracted part on the x axis, and the direction of vertical magnification on the y axis. The value of Ra was then given in $\mu$m units by the following expression (1):

$$Ra = (1/L) \int_0^L |f(x)| dx \quad (1)$$

in Table 2, and FIGS. 1 and 2. Table 2 shows grain sizes and surface properties in each thermal-flattening condition. FIG. 1 shows the relationship between the thermal-flattening condition and the flatness, and FIG. 2 shows the relationship between the thermal-flattening

TABLE 1

| Composition No. | Component | | | | | | Strength | | | Crack | Number of Substrates with Pitting (Number) | Average Grain Size (μm) | Surface Property (Ra) (μm) |
|---|---|---|---|---|---|---|---|---|---|---|---|---|---|
| | Mo (%) | O % | N % | C % | O + 2N + 0.75C % | Remainder | Tensile Strength (kg/mm$^2$) | Yield Strength (kg/mm$^2$) | Elongation (%) | | | | |
| Example | | | | | | | | | | | | | |
| 1 | 0.53 | 0.08 | 0.015 | 0.04 | 0.140 | Ti | 35.9 | 26.8 | 44.6 | o | 0 | 27 | 0.02 |
| 2 | 0.75 | 0.08 | 0.018 | 0.04 | 0.146 | Ti | 36.4 | 27.0 | 42.8 | o | 0 | 21 | 0.02 |
| 3 | 0.92 | 0.09 | 0.015 | 0.07 | 0.173 | Ti | 35.7 | 26.4 | 46.0 | o | 0 | 19 | 0.02 |
| 4 | 0.88 | 0.32 | 0.016 | 0.04 | 0.382 | Ti | 57.1 | 42.7 | 29.4 | o | 0 | 20 | 0.02 |
| 5 | 0.90 | 0.40 | 0.018 | 0.04 | 0.462 | Ti | 59.8 | 43.0 | 26.7 | o | 0 | 20 | 0.02 |
| Comparative Example | | | | | | | | | | | | | |
| 6 | 0.41 | 0.05 | 0.015 | 0.10 | 0.155 | Ti | 36.0 | 27.4 | 42.9 | o | 0 | 52 | 0.06 |
| 7 | 1.09 | 0.08 | 0.019 | 0.05 | 0.156 | Ti | 36.7 | 27.9 | 40.0 | o | 10 | 17 | 0.02 |
| 8 | 0.52 | 0.004 | 0.008 | 0.005 | 0.024 | Ti | 22.0 | 17.4 | 52.0 | o | 0 | 20 | 0.02 |
| 9 | 0.64 | 0.54 | 0.012 | 0.006 | 0.569 | Ti | 64.9 | 51.0 | 18.3 | x | 0 | 26 | 0.02 |

As shown in Table 1, the disks represented by the composition numbers 1 to 5 within the range of the present invention had sufficient strength, no cracks and no pits. The disks had excellent surface properties of Ra=0.02 μm. The disk of the composition number 6 having a small amount of Mo had a large average grain size and a poor surface property of Ra=0.06 μm. In the disk of the composition number 7 having a large amount of Mo, pits were produced. In addition, the disk of the composition number 8 having a small content of O+2N+0.75C had small yield strength. In the disk of condition and the average grain size. Referring to FIG. 1, symbol o indicates disks each having average flatness of less than 100 μm, and symbol ● represents disks each having average flatness of 100 μm or more. Referring to FIG. 2, symbol o represents disks each having an average grain size of 30 μm or less, and symbol ● represents disks having an average grain size of more than 30 μm.

Note that the above flatness indicates a maximum displacement value at a length of 100 mm, and the flatness of a practical magnetic disk substrate is required to be less than 100 μm.

TABLE 2

| Heating Temperature | Heating Time | | | | | | | | |
|---|---|---|---|---|---|---|---|---|---|
| | 0.5 Hour Grain Size (Ra) μm | 1.0 Hour Grain Size (Ra) μm | 2.0 Hour Grain Size (Ra) μm | 4.0 Hour Grain Size (Ra) μm | 6.0 Hour Grain Size (Ra) μm | 8.0 Hour Grain Size (Ra) μm | 10.0 Hour Grain Size (Ra) μm | 12.0 Hour Grain Size (Ra) μm | 14.0 Hour Grain Size (Ra) μm |
| 400° C. | Non recrystal (0.02) | — | — | — | Non recrystal (0.02) | — | 15 (0.02) | — | — |
| 500° C. | Non recrystal (0.02) | — | No recrystal (0.02) | 14 (0.02) | 18 (0.02) | 17 (0.02) | 17 (0.02) | 18 (0.02) | — |
| 550° C. | — | — | — | — | — | — | 26 (0.02) | 24 (0.02) | 35 (0.04) |
| 600° C. | Non recrystal (0.02) | 10 (0.02) | 16 (0.02) | 15 (0.02) | 20 (0.02) | 27 (0.02) | 42 (0.03) | — | — |
| 650° C. | — | 12 (0.02) | 18 (0.02) | 26 (0.02) | 45 (0.03) | 47 (0.04) | — | — | — |
| 700° C. | — | 28 (0.02) | — | 52 (0.06) | — | — | — | — | — | the composition number 9 having a large content of O+2N +0.75C, cracks were produced.

That is, it was assured that if the composition of the magnetic disk substrate was within the range of the present invention, a magnetic disk substrate with excellent properties could be obtained.

The substrate of the composition number 5 having a composition within the range of the present invention was examined by changes in conditions of the thermal-flattening to obtain grain sizes, surface properties, and flatness in each of the conditions. The results are shown As can be apparent from Table 2, the following results can be confirmed. When the average grain size was less than 30 μm, all the surface properties Ra were desirably 0.02 μm or less. When the average grain size exceeds 30 μm, Ra was more than 0.02 μm.

As is apparent from FIG. 1, the following result could be confirmed. When a thermal-flattening temperature was less than 500° C. or a thermal-flattening time was less than 1 hour, the average flatness was 100 μm or more which was not a sufficient value.

In addition, as shown in FIG. 2, the average grain size exceeded 30 μm in an area where the thermal-flattening temperature was high and the thermal-flattening time was long. A boundary line of the average grain size of 30 μm was a line indicates by the alternate long and short dashed line in FIG. 2. Assuming that a flattening temperature was represented by T (° C.) and the time was represented by t (hour), the boundary line was expressed by the following equation:

$$T = -(150/11) \cdot t + 7850/11$$

Therefore, in the area of $T \leq -(150/11) \cdot t + 7850/11$, the average grain size of less than 30 μm could be obtained. In an area where the condition was not satisfied, the average grain size was increased. In the area wherein the average grain size was more than 30 μm, since Ra was more than 0.02 μm as described above, it was assured that an increase in roughness of the grain size was a cause for degradation of the surface properties.

The influence of a cold-rolling condition in the surface properties of the substrate will be described below.

The ingot of the composition number 5 was forged, hot-rolled and ground under the same condition as described above to be formed into a plate having a thickness of 5 mm, and the plate was cold-rolled in the condition illustrated in Table 3. Ring plates (outer diameter of 95 mm and inner diameter of 25 mm) were formed by punching out the cold-rolled sheet to form disk substrate materials. The materials were thermal-flattened at a temperature of 600° C. for 6 hours and polished under the same conditions as described above to obtain 5 magnetic disk substrate samples for each of cold rolling conditions. In the samples formed in the above described manner, their grain sizes and surface properties (Ra) were estimated. Table 3 shows the cold rolling conditions and properties of the samples.

TABLE 3

| Cold Rolling Rate | Average Grain Size | Ra (μm) |
|---|---|---|
| 10 | 80 | 0.05 |
| 30 | 26 | 0.02 |
| 50 | 25 | 0.02 |
| 70 | 23 | 0.02 |
| 90 | 20 | 0.02 |

As described in Table 3, in the cold rolling ratio of 30% or more, it was confirmed to obtain an average grain size of 30 μm or less and excellent surface properties.

As described above, it was confirmed that when the substrate composition was within the range of the present invention, a magnetic disk substrate having excellent surface properties could be obtained, and that when the average grain size was controlled to be 30 μm or less, more excellent surface properties could be obtained. In addition, an alloy plate having a composition within the range of the present invention can be cold-rolled at 30% or more and thermal-flattened under a condition which satisfies $500 \leq T \leq -(150/11) \cdot t + (7850/11)$ and $1 \leq t$, where a thermal-flattened temperature is T° C. and a thermal-flattening time is t hour, thereby controlling the average grain size to be 30 μm or less. Therefore, more excellent surface properties can be obtained.

Note that a magnetic disk substrate of the present invention can also be employed for a high-density recording medium such as an Fe oxide thin film or a barium ferrite thin film requiring a high substrate temperature.

Additional advantages and modifications will readily occur to those skilled in the art. Therefore, the invention in its broader aspects is not limited to the specific details, representative articles, and illustrated examples shown and described herein. Accordingly, various modifications may be made without departing from the spirit or scope of the general inventive concept as defined by the appended claims and their equivalents.

What is claimed is:

1. A method of manufacturing a titanium alloy magnetic disk substrate comprising
    (a) cold-rolling an alloy plate at a rolling ratio of no less than 30%, the alloy plate comprising 0.5 wt. % to 1.0 wt. % of Mo and containing oxygen, nitrogen and carbon in amounts such that O+2N+0.75C is from 0.03 wt. % to 0.5 wt. % of the titanium alloy, and the balance being Ti, wherein O is the wt. % of oxygen, N is the wt. % of nitrogen and C is the wt. % of C, to form a magnetic disk substrate material and then
    (b) thermal-flattening the magnetic substrate material from step (a) under a temperature and time condition defined as follows:

$$500 \leq T \leq -(150/11) \cdot t + 7,850/11 \quad 1 \leq t$$

where T represents a thermal-flattening temperature in ° C., and t represents a thermal-flattening time in hours.

2. The method of claim 1, wherein the cold-rolling is carried out to form a magnetic disk substrate with a thickness of 0.6 mm.

3. The method of claim 1, wherein the alloy plate consists essentially of
    0.53 wt. % Mo,
    0.08 wt. % O,
    0.015 wt. % N,
    0.04 wt. % C and the remainder being Ti.

4. The method of claim 1, wherein the alloy plate consists essentially of
    0.75 wt. % Mo,
    0.08 wt. % O,
    0.018 wt. % N,
    0.04 wt. % C and the remainder being Ti.

5. The method of claim 1, wherein the alloy plate consists essentially of
    0.92 wt. % Mo,
    0.09 wt. % O,
    0.015 wt. % N,
    0.07 wt. % C and the remainder being Ti.

6. The method of claim 1, wherein the alloy plate consists essentially of
    0.88 wt. % Mo,
    0.32 wt. % O,
    0.016 wt. % N,
    0.04 wt. % C and the remainder being Ti.

7. The method of claim 1, wherein the alloy plate consists essentially of
    0.90 wt. % Mo,
    0.40 wt. % O,
    0.015 wt. % N,
    0.10 wt. % C and the remainder being Ti.

8. The method of claim 1, wherein the thermal-flattening temperature is 400° C. and the thermal-flattening time is 10 hours.

9. The method of claim 1, wherein the thermal-flattening temperature is 500° C. and the thermal flattening time is 4 hours to 12 hours.

10. The method of claim 1, wherein the thermal-flattening temperature is 550° C. and the thermal-flattening time is 10 hours to 12 hours.

11. The method of claim 1, wherein the thermal-flattening temperature is 600° C. and the thermal-flattening time is 1 hours to 8 hours.

12. The method of claim 1, wherein the thermal-flattening temperature is 650° C. and the thermal-flattening time is 1 hour to 4 hours.

13. The method of claim 1, wherein the thermal-flattening temperature is 700° C. and the thermal-flattening time is 1 hour.

14. The method of claim 1 wherein the thermal-flattening temperature is 600° C. and the thermal-flattening time is 6 hours.

15. The method of claim 1, wherein the rolling ratio is 30% to 90%.

16. The method of claim 11, wherein the rolling ratio is 30% to 90%.

17. The method of claim 12, wherein the rolling ratio is 30% to 90%.

* * * * *